(12) United States Patent
Park et al.

(10) Patent No.: US 12,744,162 B2
(45) Date of Patent: Sep. 22, 2026

(54) MULTILAYER ELECTRONIC COMPONENT INCLUDING SIDE MARGIN PORTIONS AND METHOD OF MANUFACTURING THE SAME

(71) Applicant: SAMSUNG ELECTRO-MECHANICS CO., LTD., Suwon-si (KR)

(72) Inventors: Yong Park, Suwon-si (KR); Min Woo Kim, Suwon-si (KR); Jong Ho Lee, Suwon-si (KR); Eun Jung Lee, Suwon-si (KR); Yong Min Hong, Suwon-si (KR); Yong Ung Lee, Suwon-si (KR); Jung Tae Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 130 days.

(21) Appl. No.: 18/432,474

(22) Filed: Feb. 5, 2024

(65) Prior Publication Data

US 2024/0355548 A1 Oct. 24, 2024

(30) Foreign Application Priority Data

Apr. 21, 2023 (KR) ........................ 10-2023-0052714

(51) Int. Cl.
*H01G 4/30* (2006.01)
*C04B 35/64* (2006.01)
(Continued)

(52) U.S. Cl.
CPC ............... *H01G 4/30* (2013.01); *C04B 35/64* (2013.01); *H01G 4/008* (2013.01); *H01G 4/012* (2013.01); *H01G 4/12* (2013.01); *H01G 4/224* (2013.01)

(58) Field of Classification Search
CPC .......... H01G 4/30; H01G 4/008; H01G 4/012; H01G 4/12; H01G 4/224; H01G 4/232; H01G 4/1209; H01G 13/00; C04B 35/64
See application file for complete search history.

(56) References Cited

U.S. PATENT DOCUMENTS

2012/0073129 A1 3/2012 Abe et al.
2013/0063862 A1* 3/2013 Kim ........................ H01G 4/30 156/182
(Continued)

FOREIGN PATENT DOCUMENTS

JP 2012-094819 A 5/2012
JP 2017-059820 A 3/2017
JP 2020-043250 A 3/2020

*Primary Examiner* — Timothy J. Dole
(74) *Attorney, Agent, or Firm* — Morgan, Lewis & Bockius LLP

(57) ABSTRACT

In an example embodiment of the present disclosure, an average distance in the first direction from the active-cover boundary to an end of the side margin portion in the first direction closest to the active-cover boundary among ends of the side margin portion in the first direction is defined as A1, and an average distance in the third direction from the first body-side margin boundary to an end of the side margin portion in the third direction closest to the first body-side margin boundary among ends of the side margin portion in the third direction is defined as A2, and then, A1/A2 is adjusted.

18 Claims, 9 Drawing Sheets

(51) Int. Cl.

| | |
|---|---|
| ***H01G 4/008*** | (2006.01) |
| ***H01G 4/012*** | (2006.01) |
| ***H01G 4/12*** | (2006.01) |
| ***H01G 4/224*** | (2006.01) |

(56) References Cited

U.S. PATENT DOCUMENTS

| | | | | |
|---|---|---|---|---|
| 2013/0222972 | A1* | 8/2013 | Saito | H01G 4/005<br>361/301.4 |
| 2015/0213955 | A1* | 7/2015 | Lee | H01G 4/30<br>174/258 |
| 2016/0225525 | A1* | 8/2016 | Mizuno | H01G 4/30 |
| 2017/0076867 | A1 | 3/2017 | Okai et al. | |
| 2017/0098506 | A1* | 4/2017 | Ando | H01G 4/228 |
| 2017/0287644 | A1* | 10/2017 | Kurokawa | H01G 4/248 |
| 2018/0108482 | A1* | 4/2018 | Kogure | H01G 4/224 |
| 2019/0084040 | A1* | 3/2019 | Ishii | B22F 1/065 |
| 2020/0051739 | A1* | 2/2020 | Park | H01G 4/0085 |
| 2020/0075258 | A1* | 3/2020 | Park | H01G 4/232 |
| 2021/0020371 | A1* | 1/2021 | Kim | H01G 4/012 |
| 2021/0035743 | A1* | 2/2021 | Nakamura | H01G 2/065 |
| 2021/0050154 | A1* | 2/2021 | Kang | H01G 4/1209 |
| 2024/0355543 | A1* | 10/2024 | Yasuda | H01G 4/224 |

* cited by examiner

MULTILAYER ELECTRONIC COMPONENT INCLUDING SIDE MARGIN PORTIONS AND METHOD OF MANUFACTURING THE SAME

CROSS-REFERENCE TO RELATED APPLICATION(S)

This application claims benefit of priority to Korean Patent Application No. 10-2023-0052714 filed on Apr. 21, 2023, in the Korean Intellectual Property Office, the disclosure of which is incorporated herein by reference in its entirety.

TECHNICAL FIELD

The present disclosure relates to a multilayer electronic component and a method of manufacturing the same.

A multilayer ceramic capacitor (MLCC), a multilayer electronic component, is a chip-type condenser mounted on the printed circuit boards of various types of electronic products such as image display devices including a liquid crystal display (LCD) and a plasma display panel (PDP), computers, smartphones, and mobile phones, and serves to charge or discharge electricity therein or therefrom.

Conventionally, by means of a method of increasing the capacitance of a multilayer ceramic capacitor simultaneously with miniaturizing the same, an area of an internal electrode in a width direction may be maximized through a margin-free design by allowing the internal electrode to be exposed in a width direction of the body, but after manufacturing a unit chip in this manner, in a pre-sintering operation, a process of separately attaching a side margin portion to an exposed surface of the internal electrode of the unit chip in a width direction is being applied.

A conventional method of attaching and punching a side margin complies with a method of attaching and pressing a sheet for a side margin portion detached from a molding film to a side surface of a unit chip. In the pressing and punching process, physical properties may change due to stretching of the sheet by heat and volatilization of an organic solvent, which may cause detachment of the sheet, an increase in the time required for the process, and unevenness of a fracture surface.

The detachment of the sheet and the unevenness of a fracture surface may lead to a moisture penetration path in the multilayer electronic component, which may be a main cause of deteriorating moisture resistance reliability.

Accordingly, in the process of attaching and punching the side margin portion, there is a need for research on a multilayer electronic component and a method of manufacturing the multilayer electronic component, which can minimize damage to the side margin portion.

SUMMARY

An aspect of the present disclosure is to provide a multilayer electronic component that can suppress a decrease in moisture resistance reliability due to damage to a side margin portion, in a multilayer electronic component to which the side margin portion is attached.

An aspect of the present disclosure is to provide a manufacturing method for preventing damage to a side margin portion in the case of forming the side margin portion by attaching and punching a sheet for the side margin portion on an attachment surface of the side margin portion.

However, the aspects of the present disclosure are not limited to the above-described contents, and may be more easily understood in the process of describing specific embodiments of the present disclosure.

According to an aspect of the present disclosure, A multilayer electronic component includes: a body including a dielectric layer and an internal electrode alternately arranged in a first direction, and including an active portion in which the dielectric layer and the internal electrode overlap each other in the first direction, and cover portions respectively disposed on one surface and the other surface of the active portion in the first direction; external electrodes respectively disposed on one surface and the other surface of the body in a second direction, perpendicular to the first direction; and side margin portions respectively disposed on one surface and the other surface of the body in a third direction, perpendicular to the first direction and the second direction. In a cross-section in the first direction and the third direction, a boundary between the active portion and the cover portion is defined as an active-cover boundary, a boundary between the body and the side margin portion is defined as a first body-side margin boundary, an average distance in the first direction from the active-cover boundary to an end of the side margin portion in the first direction closest to the active-cover boundary among ends of the side margin portion in the first direction is defined as A1, an average distance in the third direction from the first body-side margin boundary to an end of the side margin portion in the third direction closest to the first body-side margin boundary among ends of the side margin portion in the third direction is defined as A2, and A1/A2 is more than 1.5 and less than 2.5.

According to another aspect of the present disclosure, a method of manufacturing a multilayer electronic component includes: forming a body including a dielectric layer and an internal electrode alternately disposed in a first direction, and including an active portion in which the dielectric layer and the internal electrode overlap each other in the first direction, and a cover portion disposed on one surface and the other surface of the active portion in the first direction; forming an external electrode on one surface and the other surface of the body in the second direction, perpendicular to the first direction; and forming a side margin portion on one surface and the other surface of the body in a third direction, perpendicular to the first direction and the second direction. In a cross-section in the first direction and the third direction, a boundary between the active portion and the cover portion is defined as an active-cover boundary, a boundary between the body and the side margin portion is defined as a first body-side margin boundary, an average distance in the first direction from the active-cover boundary to an end of the side margin portion in the first direction closest to the active-cover boundary among ends of the side margin portion in the first direction is defined as A1, an average distance in the third direction from the first body-side margin boundary to an end of the side margin portion in the third direction closest to the first body-side margin boundary among ends of the side margin portion in the third direction is defined as A2, and A1/A2 is more than 1.5 and less than 2.5.

One of effects of the present disclosure is to provide a multilayer electronic component that can suppress a decrease in moisture resistance reliability due to damage to a side margin portion, in a multilayer electronic component to which the side margin portion is attached.

Another of effects of the present disclosure is to provide a manufacturing method for preventing damage to a side margin portion in the case of forming the side margin portion by attaching and punching a ceramic green sheet for the side margin portion on an attachment surface of the side margin portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
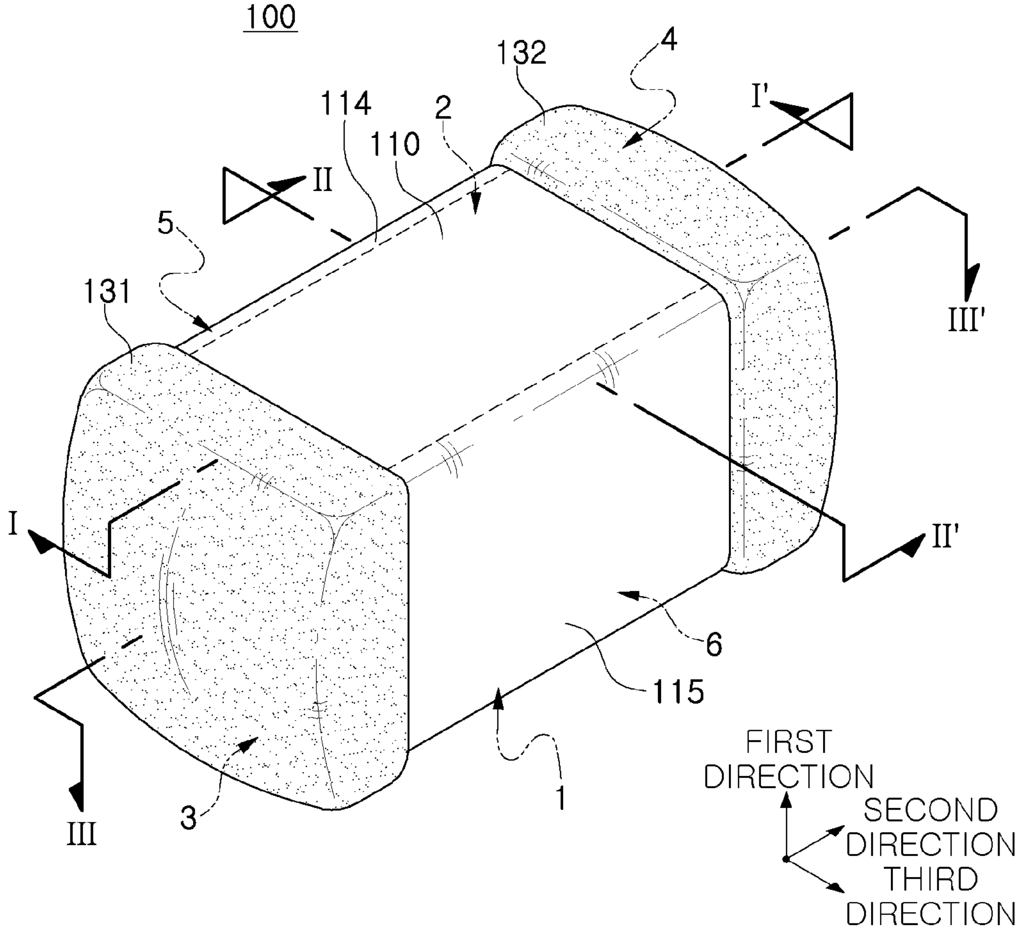
FIG. 1 is a perspective view schematically illustrating a multilayer electronic component according to an example embodiment of the present disclosure.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. Furthermore, the example embodiments disclosed herein are provided for those skilled in the art to better explain the present disclosure. Accordingly, in the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily shown for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a direction in which a plurality of green sheets are stacked, or a thickness T direction, and among second and third directions, perpendicular to the first direction, the second direction may be defined as a length L direction, and the third direction may be defined as a width W direction.

Multilayer Electronic Component

FIG. 1 is a perspective view schematically illustrating a multilayer electronic component according to an example embodiment of the present disclosure.

Figure 2:
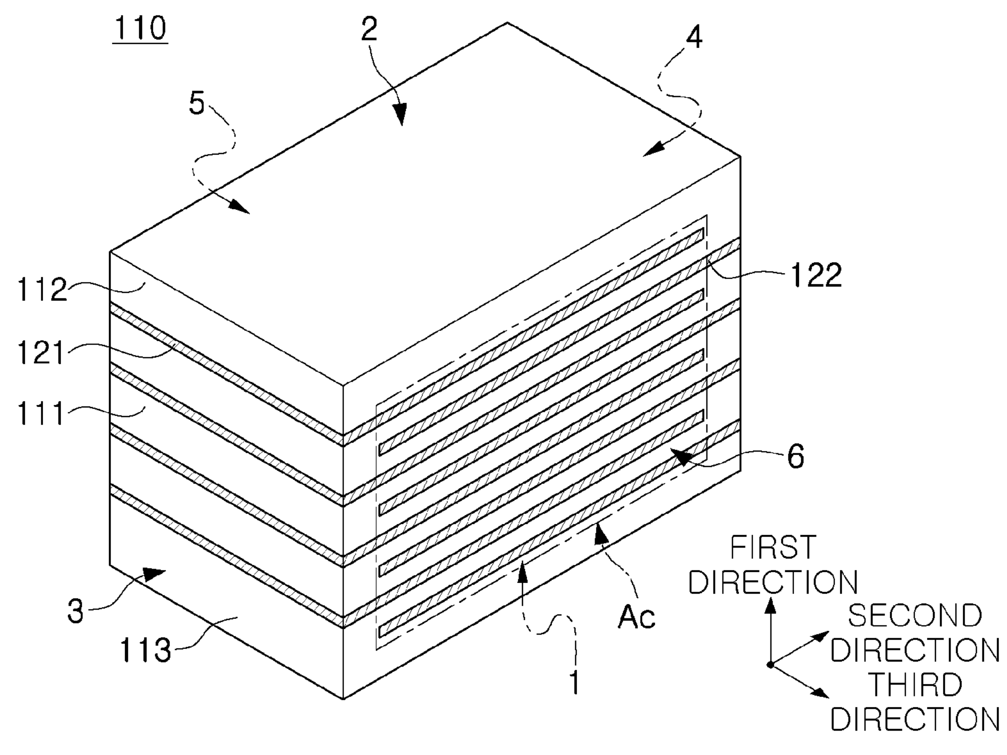
FIG. 2 is a perspective view schematically illustrating a body according to an example embodiment.

FIG. 2 is a perspective view schematically illustrating a body according to an example embodiment.

Figure 3:
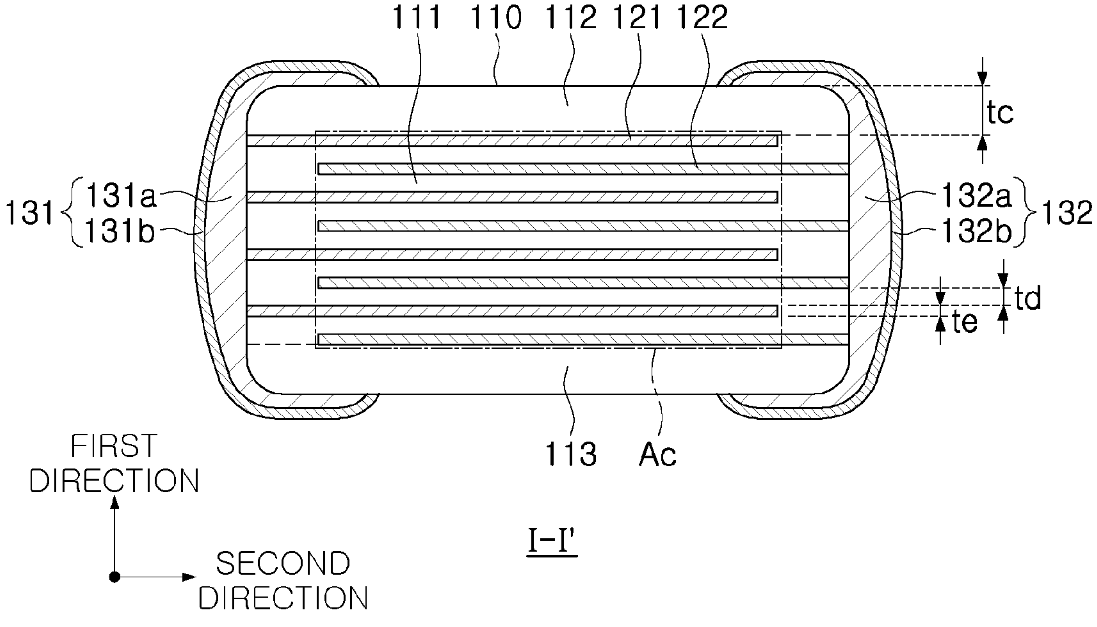
FIG. 3 is a cross-sectional view taken along line I-I' of FIG. 1.

FIG. 3 is a cross-sectional view taken along line I-I' of FIG. 1.

Figure 4:
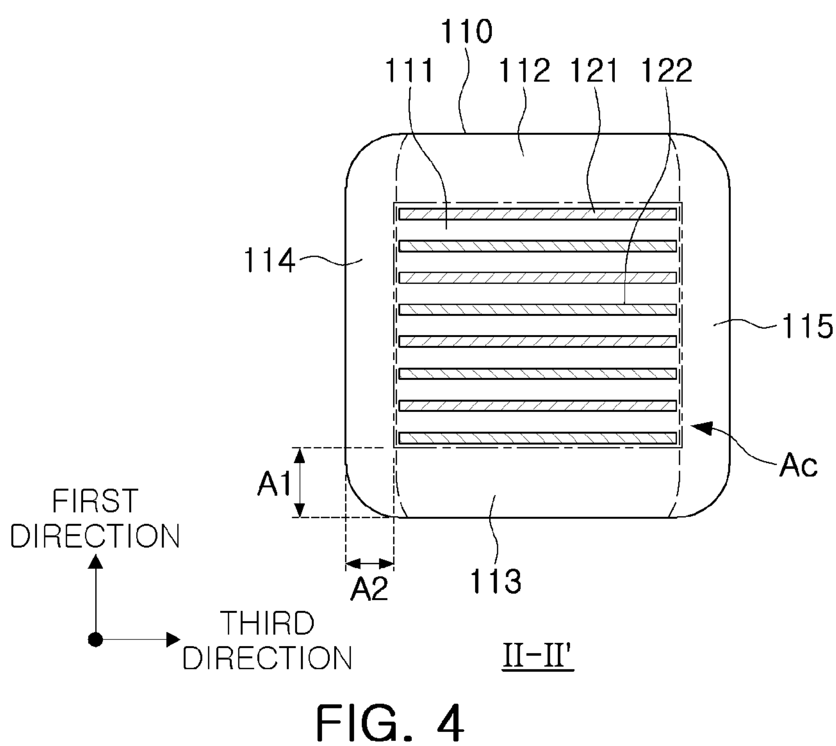
FIG. 4 is a cross-sectional view taken along line II-II' of FIG. 1.
Figure 5:
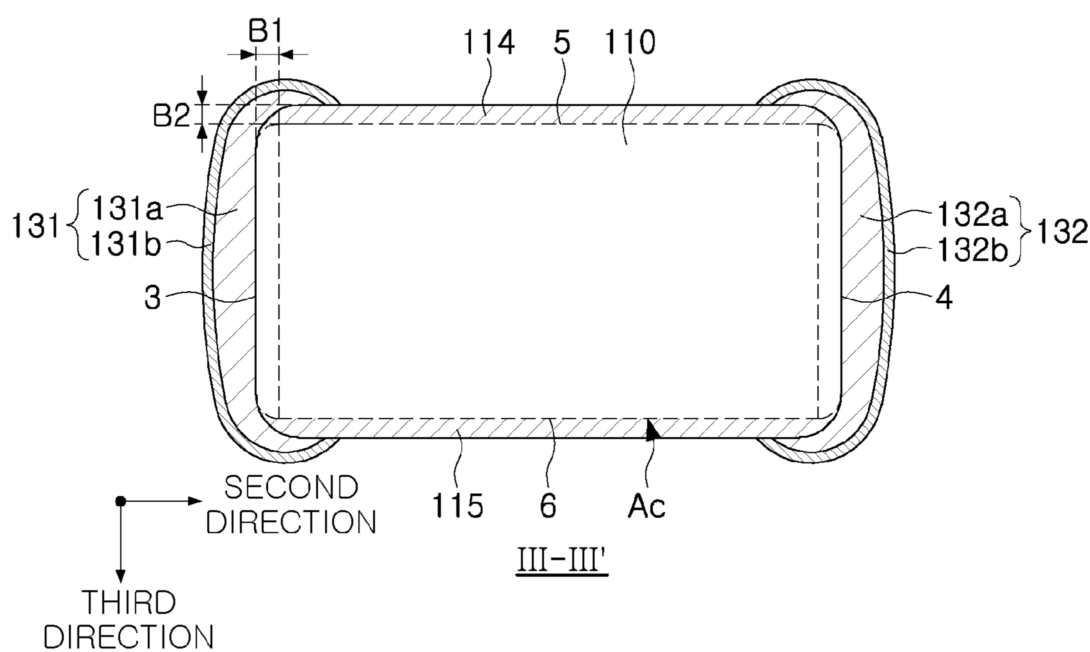
FIG. 5 is a cross-sectional view taken along line III-III' in FIG. 1.

FIG. 4 is a cross-sectional view taken along line II-II' of FIG. 1;

FIG. 5 is a cross-sectional view taken along line III-III' in FIG. 1.

Hereinafter, a multilayer electronic component 100 according to an example embodiment of the present disclosure and various example embodiments thereof will be described in detail with reference to FIGS. 1 to 5.

According to an example embodiment of the present disclosure, a multilayer electronic component includes: a body 110 including a dielectric layer 111 and internal electrodes 121 and 122 alternately arranged in the first direction, and including an active portion Ac in which the dielectric layer and the internal electrode overlap each other in the first direction, and cover portions 112 and 113 disposed on one surface and the other surface of the active part in the first direction; external electrodes 131 and 132 disposed on one surface and the other surface of the body in the second direction, perpendicular to the first direction; and side margin portions 114 and 115 disposed on one surface and the other surface of the body in the third direction, perpendicular to the first direction and the second direction, and when in a cross-section in the first direction and the third direction, a boundary between the active portion and the cover portion is defined as an active-cover boundary, a boundary between the body and the side margin portion is defined as a first body-side margin boundary, an average distance in the first direction from the active-cover boundary to an end of the side margin portion in the first direction closest to the active-cover boundary among ends of the side margin portion in the first direction is defined as A1, and an average distance in the third direction from the first body-side margin boundary to an end of the side margin portion in the third direction closest to the first body-side margin boundary among ends of the side margin portion in the third direction is defined as A2, A1/A2 is more than 1.5 and less than 2.5.

The body 110 includes the dielectric layer 111 and the internal electrodes 121 and 122 alternately disposed in the first direction, and includes the active portion Ac in which the dielectric layer and the internal electrode overlap each other in the first direction, and cover portions 112 and 113 disposed on one surface and the other surface of the active portion in the first direction.

There is no particular limitation on a specific shape of the body 110, but as illustrated in FIG. 2, the body 110 may have a hexahedral shape or a shape similar thereto. Due to the shrinkage of ceramic powder particles included in the body 110 during a sintering process, the body 110 is not a hexahedral shape with a complete straight line, but may have a substantially hexahedral shape.

The body 110 may include one surface 1 and the other surface 2 opposing each other in the first direction, one surface 3 and the other surface 4 opposing each other in the second direction, and one surface 5 and the other surface 6 opposing each other in the third direction. In this case, the first direction may be defined as a direction in which a plurality of dielectric layers 111 and a plurality of internal electrodes 121 and 122 are stacked, the second direction is perpendicular to the first direction and may be defined as a direction in which an end of the first internal electrode 121 and an end of the second internal electrode 122 among the plurality of internal electrodes 121 and 122 are alternately exposed to a surface of the body 110, and the third direction may be defined as a direction, perpendicular to the first and second directions.

The body 110 may include a corner for connecting one surface and the other surface opposing each other in the first to third directions. The corner of the body may be formed by contraction behavior during a sintering process. In an example embodiment, the corner of the body 110 may have a rounded shape. Accordingly, it is possible to suppress chipping defects of the multilayer electronic component 100.

A method of forming the corner of the body 110 in a rounded shape is not particularly limited, but in a method of manufacturing a multilayer electronic component to be described below, in a process of pressing and punching a ceramic green sheet for a side margin portion on one surface and the other surface of a stacked body in the third direction, the pressing and punching may be performed in a state in which a carrier film is attached.

Since the dielectric layer 111 is in a sintered state, a boundary between adjacent dielectric layers 111 may be integrated to the extent that the boundary may be difficult to confirm without using a scanning electron microscope (SEM).

Materials for forming the dielectric layer 111 is not particularly limited as long as they can obtain sufficient capacitance. For example, a barium titanate-based material, a lead composite perovskite-based material, or a strontium titanate-based material may be used as the materials therefor. The barium titanate-based material may include $BaTiO_3$-based ceramic powder particles, and examples of the ceramic powder particles may include $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) which is formed by partially employing calcium (Ca) and zirconium (Zr) in $BaTiO_3$, or the like.

Furthermore, as the materials forming the dielectric layer 111, various ceramic additives, organic solvents, binders, dispersants, and the like, may be added to powder particles such as barium titanate ($BaTiO_3$) depending on the purpose of the present disclosure.

Meanwhile, an average thickness td of the dielectric layer 111 is not particularly limited. However, in general, when the dielectric layer 111 is formed thin to a thickness of less than 0.6 μm, specifically, when the average thickness td of the dielectric layer 111 is 0.35 μm or less, reliability may be degraded.

According to an example embodiment of the present disclosure, since moisture resistance reliability is improved by adjusting a shape of the side margin portions 114 and 115, even when an average thickness td of the dielectric layer 111 is 0.35 μm or less, excellent moisture resistance reliability of the multilayer electronic component 100 may be secured.

Accordingly, when the average thickness td of the dielectric layer 111 is 0.35 μm or less, an effect of the present disclosure may be more remarkable, and miniaturization and high capacitance of the multilayer electronic component 100 may be more easily achieved.

The average thickness td of the dielectric layer 111 may denote an average size of the dielectric layer 111 in the first direction disposed between the first and second internal electrodes 121 and 122. Meanwhile, when the body 110 includes a plurality of dielectric layers 111, the average thickness td of the dielectric layer 111 may denote an average thickness of at least one of a plurality of dielectric layers 111.

The average thickness td of the dielectric layer 111 may be measured by scanning an image of a cross-section of the body 110 in a length and thickness (L-T) direction with a scanning electron (SEM) microscope of 10,000× magnification. More specifically, an average value may be measured by measuring the thickness at 30 points of one dielectric layer in the scanned image, which are spaced apart from each other at equal intervals in a length direction. The 30 points spaced apart from each other at equal intervals may be designated in the active portion Ac. In addition, when the average value is measured by extending an average value measurement up to 10 dielectric layers, the average thickness of the dielectric layer may be further generalized.

Referring to FIGS. 2 to 4, the active portion Ac of the present disclosure denote a region in which the dielectric layer 111 and the internal electrodes 121 and 122 overlap each other in the first direction.

The active portion Ac is a portion that contributes to the formation of capacitance of the multilayer electronic component, and may be formed by repeatedly stacking a plurality of internal electrodes 121 and 122 with the dielectric layer 111 interposed therebetween.

The cover portions 112 and 113 are disposed on one surface and the other surface of the active portion Ac in the first direction.

The cover portions 112 and 113 may be formed by stacking a single dielectric layer or two or more dielectric layers on one surface and the other surface of the active portion Ac in the first direction, respectively, and may basically serve to prevent damage to the internal electrodes due to physical or chemical stress.

The cover portions 112 and 113 do not include internal electrodes and may include substantially the same material as the dielectric layer 111.

An average thickness tc of the cover portions 112 and 113 need not be particularly limited. However, in order to more easily achieve miniaturization and high capacitance of the multilayer electronic component, the average thickness tc of the cover portions 112 and 113 may be 15 μm or less. Here, the average thickness of the cover portions 112 and 113 may denote an average thickness of each of the first cover part 112 and the second cover part 113.

The average thickness tc of the cover portions 112 and 113 may denote a size in the first direction, and may be a value obtained by averaging first directional sizes of the cover portions 112 and 113 measured at five points spaced apart from each other at equal intervals in an upper portion or a lower portion of the active portion Ac.

The internal electrodes 121 and 122 are alternately disposed with the dielectric layer 111 in the first direction.

The internal electrodes 121 and 122 may include first and second internal electrodes 121 and 122. Referring to FIGS. 2 and 3, the first and second internal electrodes 121 and 122 are alternately disposed to oppose each other with the dielectric layer 111 forming the body 110 interposed therebetween, and may be connected to one surface and the other surface of the body 110 in the second direction, respectively. Specifically, one end of the first internal electrode 121 may be connected to one surface 3 of the body 110 in the second direction, and one end of the second internal electrode 122 may be connected to the other surface 4 of the body 110 in the second direction.

That is, the first internal electrode 121 is not connected to the second external electrode 132, but is connected to the first external electrode 131, and the second internal electrode 122 is not connected to the first external electrode 131, but is connected to the second external electrode 132. Accordingly, the first internal electrode 121 may be formed to be spaced apart from the other surface 4 of the body 110 in the second direction by a predetermined distance, and the second internal electrode 122 may be formed to be spaced apart from one surface 3 of the body 110 in the second direction by a predetermined distance. In this case, the first and second internal electrodes 121 and 122 may be electrically separated from each other by the dielectric layer 111 disposed in the middle.

Referring to FIG. 2, in an example embodiment, one end of the internal electrodes 121 and 122 in the third direction may be in contact with one surface 5 of the body 110 in the third direction, and the other end of the internal electrodes 121 and 122 in the third direction may be in contact with the other surface 6 of the body 110 in the third direction. Accordingly, by improving a proportion of the active portion Ac in total components, the capacitance per unit volume of the multilayer electronic component 100 may be maximized.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

Furthermore, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti) and alloys thereof, on the ceramic green sheet. A method of printing the conductive paste for the internal electrodes may be a screen-printing method, a gravure printing method, but the present disclosure is not limited thereto.

Meanwhile, the average thickness te of the internal electrodes 121 and 122 need not be particularly limited.

However, in general, when the internal electrodes 121 and 122 are formed to be thin with a thickness of less than 0.6 μm, specifically, when the average thickness te of the internal electrodes 121 and 122 is 0.35 μm or less, there may be a concern that reliability may be degraded.

According to an example embodiment of the present disclosure, since moisture resistance reliability is improved by adjusting the shape of the side margin portions 114 and 115, even when the average thickness te of the internal electrodes 121 and 122 is 0.35 μm or less, excellent moisture resistance reliability of the multilayer electronic component 100 may be ensured.

Accordingly, when the average thickness te of the internal electrodes 121 and 122 is 0.35 μm or less, the effect according to the present disclosure may be more remarkable, and the miniaturization and high capacitance of the multilayer electronic component 100 may be more easily achieved.

The average thickness te of the internal electrodes 121 and 122 may denote an average size of the internal electrodes 121 and 122 in the first direction. Meanwhile, when the body 110 includes a plurality of internal electrodes 121 and 122, the average thickness td of the internal electrodes 121 and 122 may denote an average thickness of at least one of a plurality of internal electrodes 121 and 122.

The average thickness of the internal electrodes 121 and 122 may be measured by scanning an image of a cross-section of the body 110 in a length and thickness (L-T) direction with a scanning electron microscope (SEM) of 10,000× magnification. More specifically, an average value may be measured by measuring the thickness at 30 points of one internal electrode in the scanned image, which are spaced apart from each other at equal intervals in a length direction. The 30 points spaced apart from each other at equal intervals may be designated in the active portion Ac. In addition, when the average value is measured by extending an average value measurement up to 10 internal electrodes, the average thickness of the internal electrodes may be further generalized.

Referring to FIGS. 1 and 3 to 4, side margin portions 114 and 115 may be disposed on one surface 5 and the other surface 6 of the body 110 in the third direction.

The side margin portions 114 and 115 may basically prevent damage to the internal electrode due to physical or chemical stress.

A method of forming the side margin portions 114 and 115 is not particularly limited. For example, a ceramic slurry for a side margin portion may be applied to a side surface of a unit chip 210 and then sintered, or a ceramic green sheet for a side margin portion may be pressed and closely attached and then sintered. The material forming the side margin portions 114 and 115 is not particularly limited, and may be formed of the same material as the dielectric layer 111, but the present disclosure is not limited thereto, and as a result of forming side margin portions 114 and 115 with a material different from that of the dielectric layer 111, the side margin portions 114 and 115 may have a different composition.

Meanwhile, a width (i.e., a dimension in the third direction) of the margin portions 114 and 115 need not be particularly limited. However, to more easily achieve miniaturization and high capacitance of the multilayer electronic component, an average width (i.e., an average dimension in the third direction) of the margin portions 114 and 115 may be 15 μm or less.

Furthermore, according to an example embodiment of the present disclosure, since the moisture resistance reliability is improved by adjusting the shape of the side margin portions 114 and 115 in the side margin portions 114 and 115, excellent reliability may be ensured even when an average width of the side margin portions 114 and 115 is 15 μm or less. The average width of the side margin portions 114 and 115 may denote an average size of the side margin portions 114 and 115 in the third direction, and may be a value obtained by averaging third directional sizes of the side margin portions 114 and 115 measured at five points spaced apart from each other at equal intervals on the side surface of the active portion Ac.

The external electrodes 131 and 132 may be disposed on the third surface 3 or the fourth surface 4 of the body 110. Specifically, the first external electrode 131 is disposed on one surface 3 of the body 110 in the second direction and connected to the first internal electrode 121, and the second external electrode 132 is disposed on the other surface 4 of the body 110 in the second direction and connected to the second internal electrode 122.

Although the present embodiment describes a structure in which the multilayer electronic component 100 has two external electrodes 131 and 132, the number or shape of the external electrodes 131 and 132 vary, according to the shape or other purposes of the internal electrodes 121 and 122.

On the other hand, the external electrodes 131 and 132 may be formed using any material as long as the material has electrical conductivity such as metal, and a specific material may be determined in consideration of electrical characteristics, structural stability, and the like, and also, the external electrodes 131 and 132 may have a multilayer structure.

Meanwhile, the external electrodes 131 and 132 may be formed on one surface and the other surface of the body 110 in the second direction, but may be disposed to extend over a portion of one surface and the other surface of the body in the first direction or one surface and the other surface of the body in the third direction. In this case, the external electrodes 131 and 132 may be disposed to cover ends of the side margin portions 114 and 115. In this case, regions of the external electrodes 131 and 132 disposed on the ends of the side margin portions 114 and 115 may have a rounded shape, thereby securing coverage of the external electrodes 131 and 132 on corners of the body 110 or the side margin portions 114 and 115.

The external electrodes 131 and 132 may include electrode layers 131*a* and 132*a* disposed in the body 110 and plating layers 131*b* and 132*b* formed on the electrode layers 131*a* and 132*a*.

In a more specific example of the electrode layers 131*a* and 132*a*, the electrode layer may be a sintered electrode including a conductive metal and glass or a resin-based electrode including the conductive metal and resin.

Furthermore, the electrode layers 131*a* and 132*a* may be in the form of sequentially forming a sintered electrode and a resin-based electrode on the body 110. Furthermore, the electrode layers 131*a* and 132*a* may be formed by transferring a sheet including the conductive metal onto the body 110, or may be formed by transferring a sheet including the conductive metal onto the sintered electrode.

A material having excellent electrical conductivity may be used as the conductive metal included in the electrode layers 131*a* and 132*a*, but is not particularly limited thereto. For example, the conductive metal may be one or more of nickel (Ni), copper (Cu), and alloys thereof.

The plating layers 131*b* and 132*b* may serve to improve airtightness or mounting characteristics of the multilayer electronic component 100. The type of plating layers 131*b* and 132*b* is not particularly limited, and the plating layers 131*b* and 132*b* may be plating layers including at least one of Ni, Sn, Pd, and alloys thereof, and may be formed of a plurality of layers.

For more specific examples of the plating layers 131*b* and 132*b*, the plating layers 131*b* and 132*b* may be plating layers including Ni or plating layers including Sn, and may have a shape in which a plating layer including Ni and a plating layer including Sn may be sequentially formed on the electrode layers 131*a* and 132*a*, respectively, or a shape in which the plating layer including Sn, the plating layer including Ni, and the plating layer including Sn may be sequentially formed. Furthermore, the plating layer may include a plurality of Ni plating layers and/or a plurality of Sn plating layers.

Conventionally, as an example of a method of forming a side margin portion, in order to suppress a step portion caused by the internal electrodes 121 and 122, there is a method of forming the side margin portions 114 and 115 by stacking the internal electrodes and then cutting the same to be exposed to one surface 5 and the other surface 6 of the body in the third direction, and then, stacking a single dielectric layer or two or more dielectric layers on one surface and the other surface of the active portion Ac in the third direction.

However, in order to form the side margin portions 114 and 115 firmly, it may not be sufficient to simply stack the dielectric layer on one surface and the other surface of the active portion Ac in the third direction, and separate high-temperature and high-pressure treatment may be required. For example, in an example embodiment, a process of pressing and punching a ceramic green sheet for a side margin portion may be performed on one surface and the other surface of a unit chip 210 in the third direction before sintering the body 110. Accordingly, the ends of the side margin portions 114 and 115 on which the sintering process has been performed may be formed unevenly, which may be a main cause of resistance reliability of the degrading the moisture multilayer electronic component 100.

Accordingly, in the present disclosure, among parameters indicating the shape of the ends of the side margin portions 114 and 115, an arrangement relationship between an active-cover boundary and a body-side margin boundary and a first directional end and a third directional end of the side margin portion may be adjusted, thus improving the moisture resistance reliability of the multilayer electronic component 100.

Referring to FIG. 3, an arrangement relationship between an active-cover boundary and a body-side margin boundary and a first directional end and a third directional end of the side margin portion may be defined in a first directional cross-section and a third directional cross-section of the multilayer electronic component 100.

First, in the first directional cross-section and the third directional cross-section of the multilayer electronic component 100, a boundary between the active portion Ac and the cover portions 112 and 113 may be defined as an active-cover boundary, and a boundary between the body 110 and the side margin portions 114 and 115 may be defined as a body-side margin boundary. In this case, the body-side margin boundary may be defined as a first body-side margin boundary to distinguish between boundaries in the first and second directional cross-sections of the multilayer electronic component 100 to be described later. Specifically, the active-cover boundary may be defined as a straight line for connecting first directional ends of the internal electrodes 121 and 122 included in the active portion Ac in the third direction, and the first body-side margin boundary may be defined as a straight line for connecting third directional ends of the internal electrodes 121 and 122 included in the active portion Ac in the first direction.

Meanwhile, since the side margin portions 114 and 115 are disposed on one surface and the other surface of the body 110 in the third direction, ends thereof may exist. The ends of the side margin portions 114 and 115 correspond to the boundary between the body 110 and the side margin portions 114 and 115, which may be a main route of external moisture penetration. Accordingly, the moisture resistance reliability of the multilayer electronic component 100 may be greatly affected by the shape of the ends of the side margin portions 114 and 115.

In the first-direction and third-direction cross-sections of the multilayer electronic component 100, the side margin portions 114 and 115 may have a first directional end and a third directional end. Here, an end in the first direction may denote an end disposed at an outermost side in the first direction with respect to a central region of the side margin portions 114 and 115 in the first direction, and an end in the third direction may denote an end disposed at an outermost side in the third direction with respect to a central region of the side margin portions 114 and 115 in the third direction.

In an example embodiment of the present disclosure, an average distance in the first direction from the active-cover boundary to the end of the side margin portion in the first direction closest to the active-cover boundary among the ends of the side margin portion in the first direction is defined as A1, and an average distance in the third direction from the first body-side margin boundary to the end of the side margin portion in the third direction closest to the first body-side margin boundary among the ends of the side margin portion in the third direction is defined as A2, and a value of A1/A2 is adjusted.

When the value of A1/A2 value is 1.5 or less, moisture resistance path may be shortened, which may lead to reduced reliability, and when the value of A1/A2 is 2.5 or more, because thickness asymmetry occurs between the cover portion and the side margin portion, a shrinkage mismatch in sintering may result in detaching the side margin portion or the cover portion.

Accordingly, in an example embodiment of the present disclosure, the value of A1/A2 may be more than 1.5 and less than 2.5, thereby improving the moisture resistance reliability of the multilayer electronic component 100.

On the other hand, since the shape of the side margin portions 114 and 115, especially, the shape of the ends of the side margin portions 114 and 115, has a three-dimensional shape, in the first and second directional cross-sections of the multilayer electronic component 100, as well as the second and third directional cross-sections thereof, simultaneously adjusting a relationship between the active-side margin boundary and the second directional end of the active part Ac and the ends of the side margin portions 114 and 115 may be a method for remarkably improving the moisture resistance reliability of the multilayer electronic component 100.

Specifically, in the cross-sections of the multilayer electronic component 100 in the second direction and the third direction, the boundary between the body 110 and the side margin portions 114 and 115 may be defined as a second body-side margin boundary.

Furthermore, in the cross-sections of the multilayer electronic component 100 in the second direction and the third direction, the side margin portions 114 and 115 may have a second directional end and a third directional end.

Here, the third directional end may denote an end disposed at an outermost side in the third direction with respect to the central region of the side margin portions 114 and 115 in the third direction, and the second directional end may denote an end positioned at an outermost side in the second direction with respect to the central region of the side margin portions 114 and 115 in the second direction.

In an example embodiment, an average distance in the second direction from an end of the active portion in the second direction to a surface closest to the end of the active portion in the second direction among surfaces of the body in the second direction is defined as B1, and an average distance in the third direction from the second body-side margin boundary to the end of the side margin portion in the third direction closest to the second body-side margin boundary among ends of the side margin portion in the third direction is defined as B2, a value of B1/B2 is adjusted.

When the B1/B2 value is 0.35 or less, a round may not be formed properly, scratchy appearance defects may occur due to chipping, and when the B1/B2 value is 0.55 or more, the round exceeds an appropriate range and thus the moisture resistance path may be short, which may degrade reliability.

Therefore, in an example embodiment, the value of B1/B2 may be adjusted to more than 0.35 and less than 0.55, thereby improving the moisture resistance reliability of the multilayer electronic component 100.

Furthermore, when the value of A1/A2 is more than 1.5 and less than 2.5, and the value of B1/B2 is more than 0.35 and less than 0.55 at the same time, an effect of improving the moisture resistance reliability may be more remarkably improved.

On the other hand, A1 and A2 representing the average distance may be an average value measured using an optical microscope (OM) or a scanning electron microscope (SEM) in first and third directional cross-sections polished to ⅓ points, ½ points, and ⅔ points of the multilayer electronic component 100 in the second direction. When these measurements are performed at four end regions of the margin portions 114 and 115 appearing in the cross-section to obtain the average value, the value of A1 and A2 may be further generalized.

The B1 and B2, which represent the average distance, may be an average value measured using the optical microscope (OM) or the scanning electron microscope (SEM) in the second and third directional cross-sections polished to ⅓ points, ½ points, and ⅔ points of the multilayer electronic component 100 in the first direction. When these measurements are performed at four end regions of the margin portions 114 and 115 appearing in the cross-section to obtain the average value, the value of B1 and B2 may be further generalized.

In an example embodiment, the side margin portions 114 and 115 may be disposed not to exceed one surface 1 and the other surface 2 of the body 110 in the first direction. In another aspect, the side margin portions 114 and 115 may be disposed not to exceed one surface 5 and the other surface 6 of the body 110 in the third direction. Accordingly, the side margin portions 114 and 115 may be formed with a minimum proportion required to ensure the moisture resistance reliability, thereby improving the capacitance per unit volume of the multilayer electronic component 100. Furthermore, a uniform thickness may be ensured when the external electrode is formed.

Method of Manufacturing a Multilayer Electronic Component

Figure 6A:
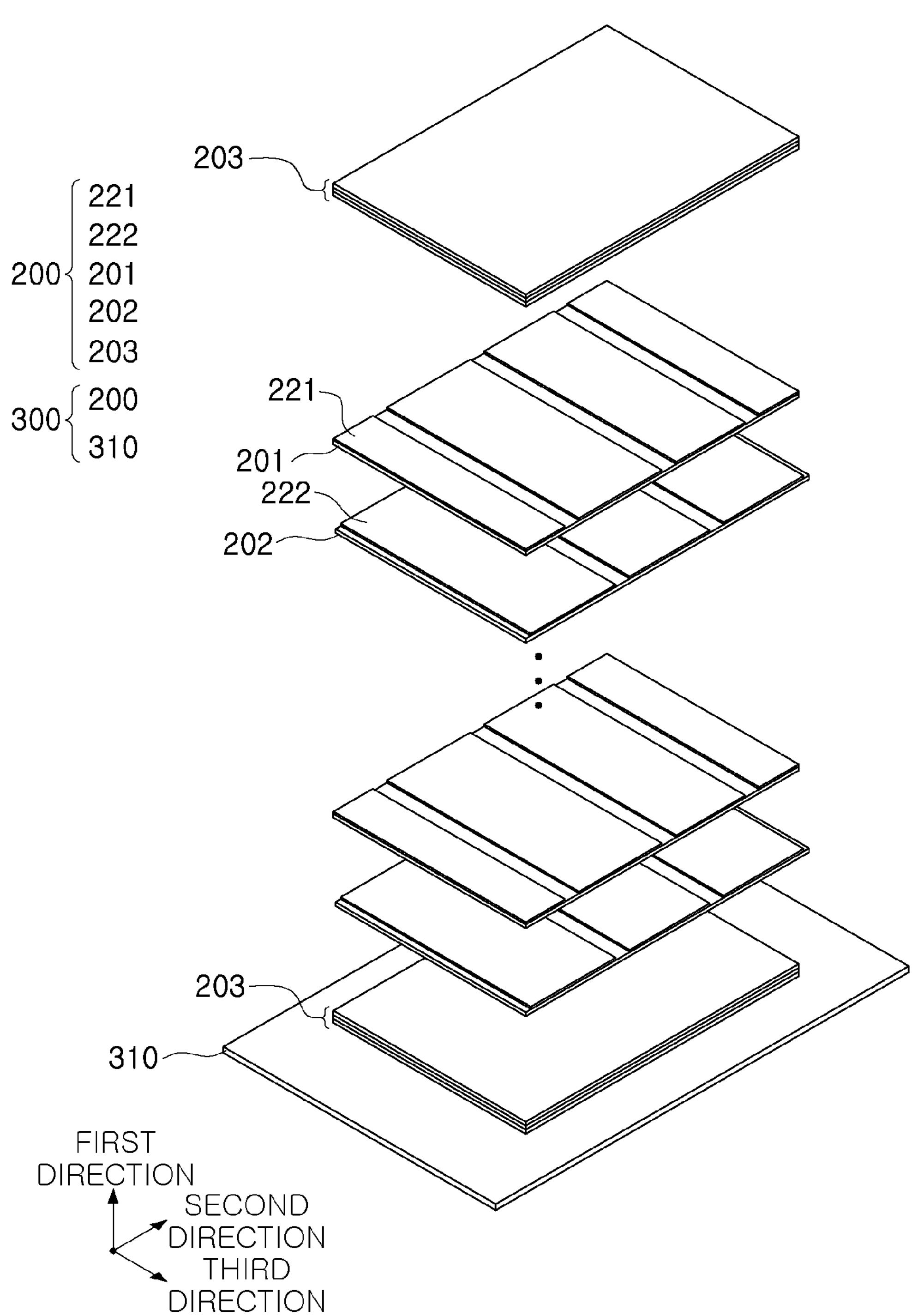
FIG. 6A is a perspective view illustrating a stacking operation in a method of manufacturing a multilayer electronic component according to an example embodiment.

FIG. 6A is a perspective view illustrating a stacking operation in a method of manufacturing a multilayer electronic component according to an example embodiment.

Figure 6B:
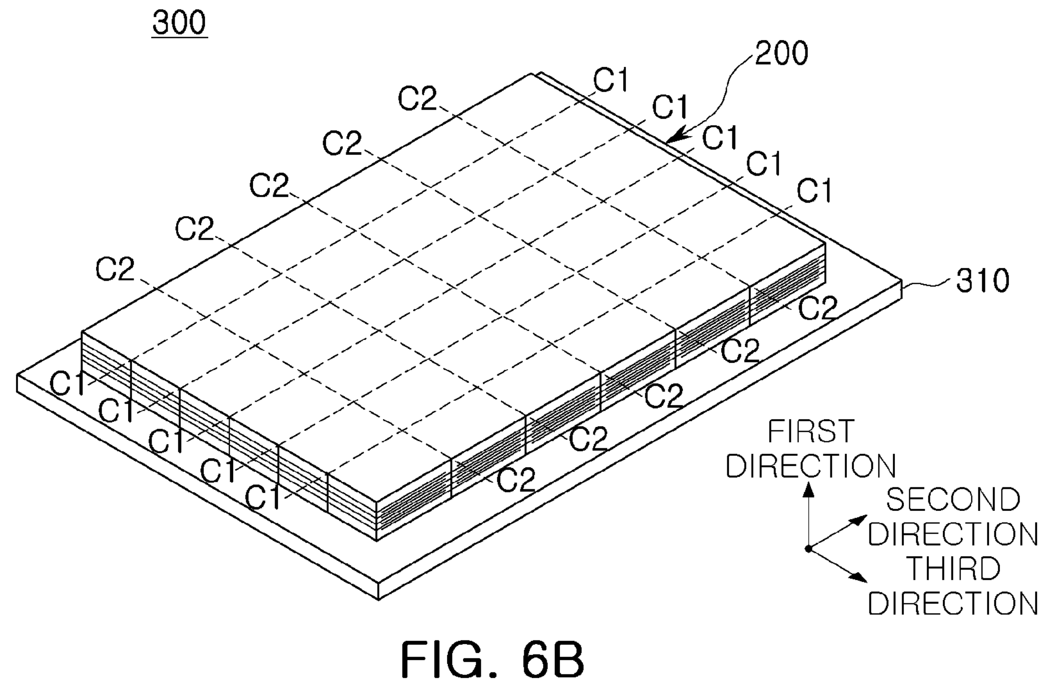
FIG. 6B is a perspective view illustrating a state immediately after a stacking operation in a method of manufacturing a multilayer electronic component according to an example embodiment.

FIG. 6B is a perspective view illustrating a state immediately after a stacking operation in a method of manufacturing a multilayer electronic component according to an example embodiment.

Figure 6C:
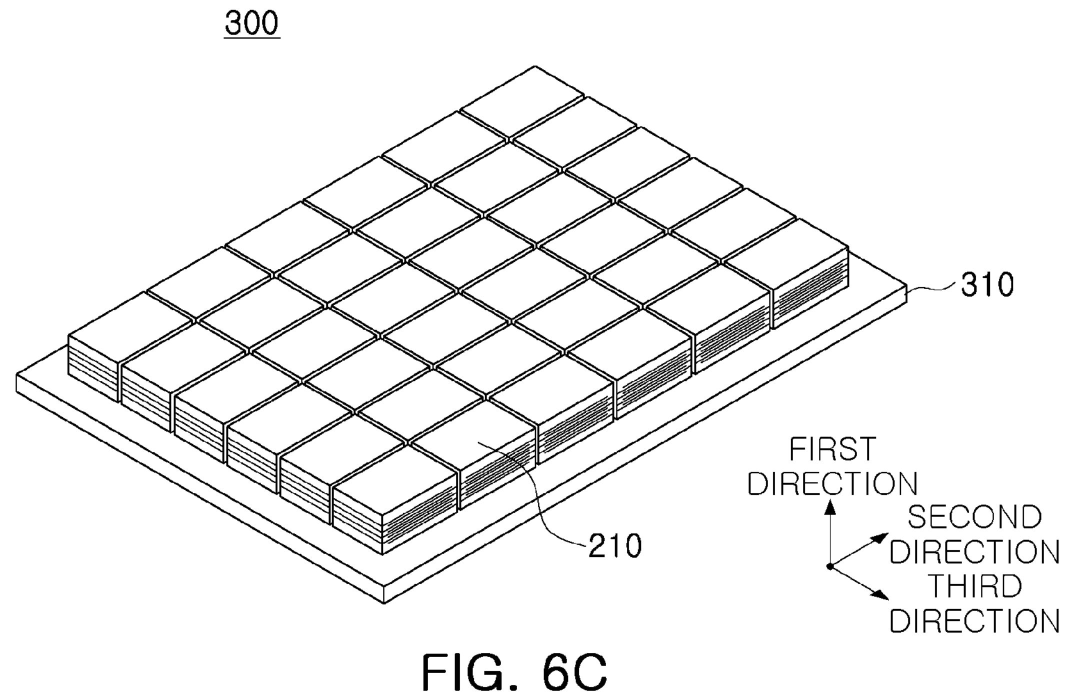
FIG. 6C is a perspective view illustrating a cutting operation in a method of manufacturing a multilayer electronic component according to an example embodiment.

FIG. 6C is a perspective view illustrating a cutting operation in a method of manufacturing a multilayer electronic component according to an example embodiment.

Figure 7A:
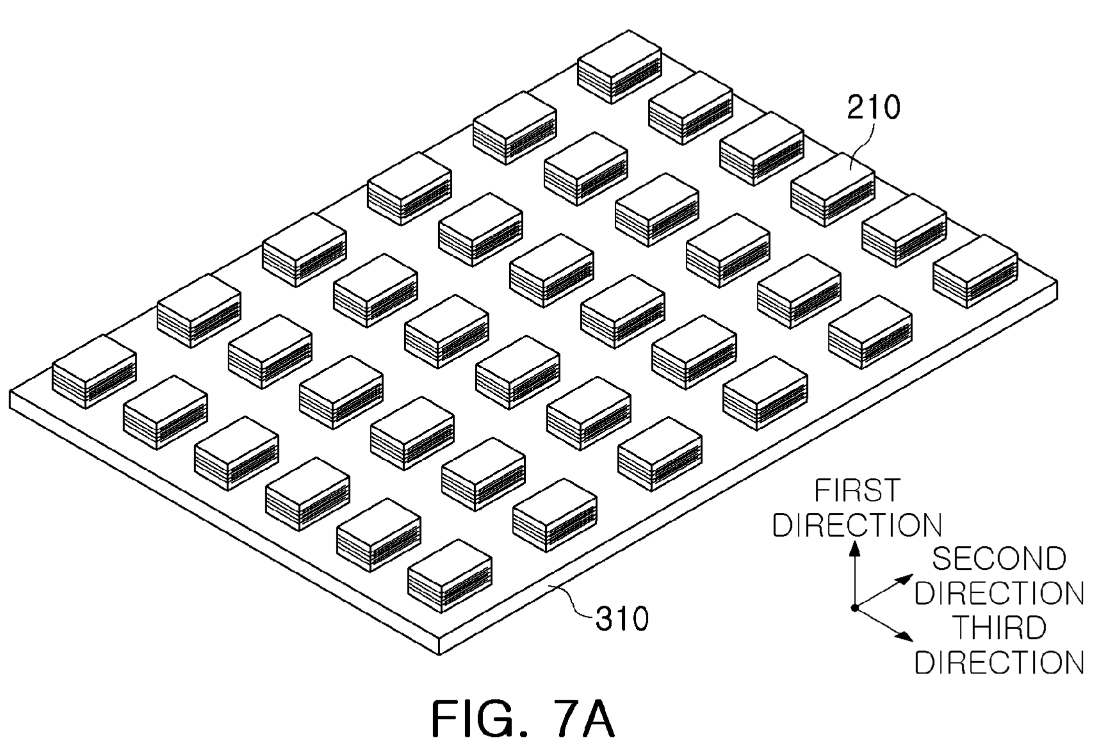
FIG. 7A is a perspective view illustrating an expansion operation in a method of manufacturing a multilayer electronic component according to an example embodiment.

FIG. 7A is a perspective view illustrating an expansion operation in a method of manufacturing a multilayer electronic component according to an example embodiment.

Figure 7B:
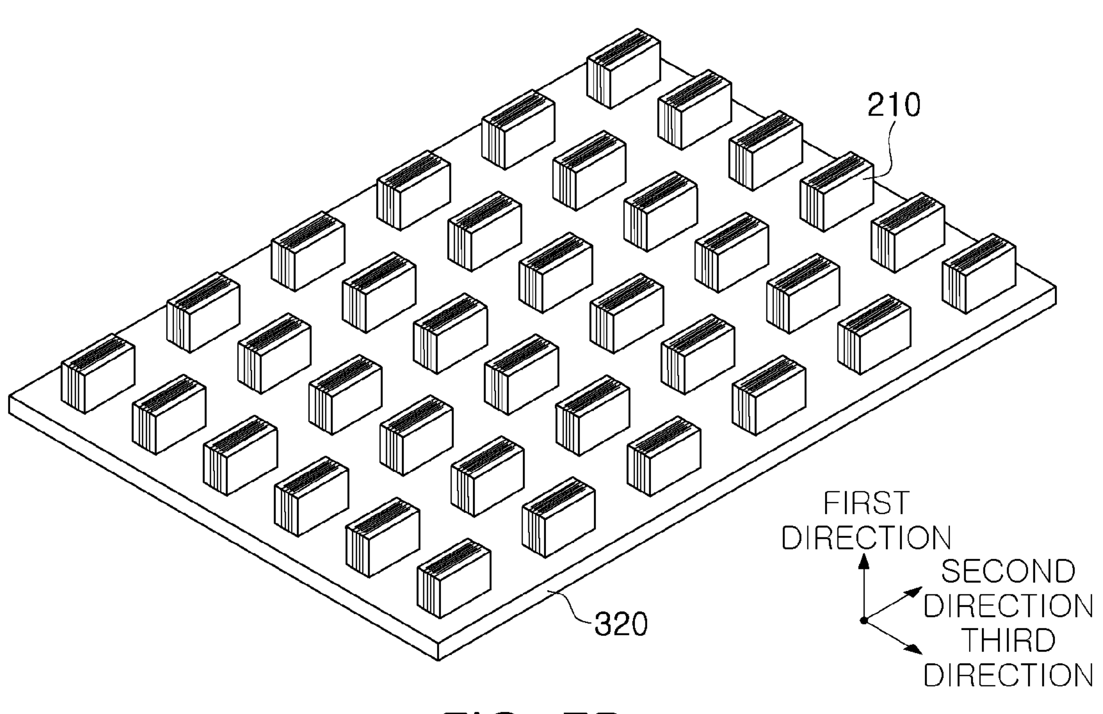
FIG. 7B is a perspective view illustrating an opening step in a method of manufacturing a multilayer electronic component according to an example embodiment.

FIG. 7B is a perspective view illustrating an opening step in a method of manufacturing a multilayer electronic component according to an example embodiment.

Figure 8A:
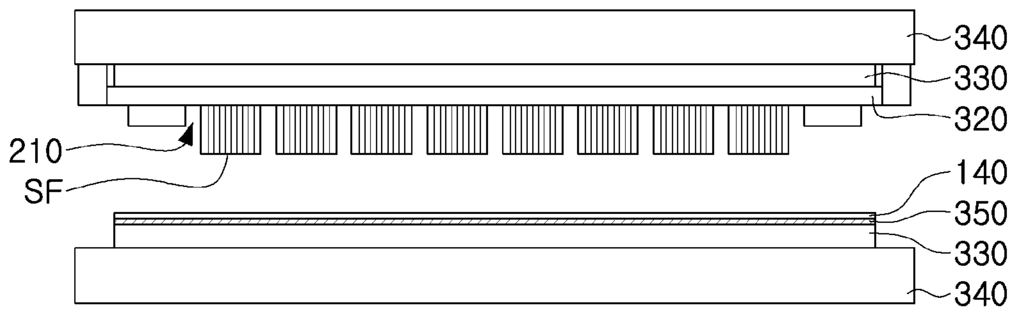
FIG. 8A is a side view illustrating a state immediately before forming a side margin portion in a method for manufacturing a multilayer electronic component according to an example embodiment.

FIG. 8A is a side view illustrating a state immediately before forming a side margin portion in a method for manufacturing a multilayer electronic component according to an example embodiment.

Figure 8B:
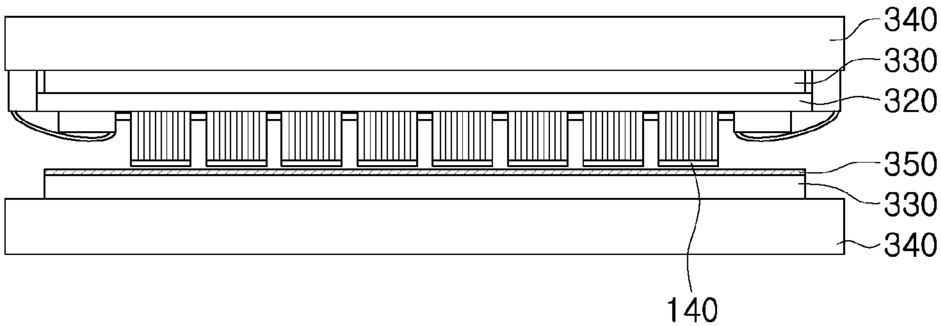
FIG. 8B is a side view showing a state immediately after pressing and punching a ceramic green sheet for a side margin portion in a method of manufacturing a multilayer electronic component according to an example embodiment.

FIG. 8B is a side view showing a state immediately after pressing and punching a ceramic green sheet for a side margin portion in a method of manufacturing a multilayer electronic component according to an example embodiment.

Figure 9:
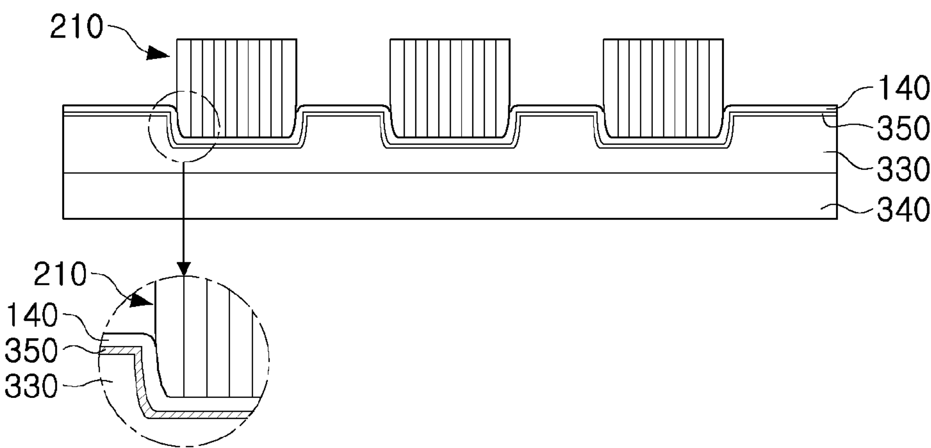
FIG. 9 is a side view illustrating a shape of a corner of a stacked body in a process in which a ceramic green sheet for a side margin portion is pressed and punched in a manufacturing method of a multilayer electronic component according to an example embodiment.

FIG. 9 is a side view illustrating a shape of a corner of a stacked body in a process in which a ceramic green sheet for a side margin portion is pressed and punched in a manufacturing method of a multilayer electronic component according to an example embodiment.

Hereinafter, a method of manufacturing a multilayer electronic component will be described in detail with reference to FIGS. 6A to 9. Since the method of manufacturing the multilayer electronic component described below is an example of manufacturing the multilayer electronic component 100 described above, it is not necessary to manufacture the multilayer electronic component 100 only by a manufacturing method to be described below.

Stacked Body Manufacturing Operation

First, in a multilayer electronic component according to an example embodiment, a stacked body manufacturing operation may be performed. A stacked body 200 may be a part forming the body 110 of the present disclosure after sintering.

In the operation of manufacturing the stacked body 200, first, a plurality of ceramic green sheets 201 and 202 in which conductive patterns 221 and 222 are disposed are stacked on a support film 310.

The support film 310 may serve to support the stacked body 200 in which the conductive patterns 221 and 222 and a plurality of ceramic green sheets 201 and 202 are stacked. In this case, in order to effectively support and attach the stacked body 200, the support film 310 may include an adhesive material such as Latex, starch, cellulose, protein, Isoprene Rubber (IR), Nitril Butadiene Rubber (NBR), Styrene Butadiene Rubber (SBR), Chloroprene Rubber (CR), Silicon Rubber, a silicon type, a urethane type, an acryl type and mixtures thereof.

A plurality of ceramic green sheets 201 and 202 may be formed of a ceramic paste including ceramic powder particles, an organic solvent, a dispersant, and a binder. The ceramic powder particles are a material for forming the dielectric layer 111 of the multilayer electronic component 100, and a barium titanate-based material, a lead composite perovskite-based material, a strontium titanate-based material, or the like may be used as the material. The barium titanate-based material may include $BaTiO_3$-based ceramic powder particles, and examples of the ceramic powder particles may include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$ which is formed by partially employing calcium (Ca) and zirconium (Zr) in $BaTiO_3$, or the like. When a plurality of ceramic green sheets 201 and 202 are sintered, the dielectric layer 111 constituting the body 110 is formed.

Meanwhile, in an example embodiment, the stacked body 200 may further include a ceramic green sheet 203 for a cover portion forming the cover portions 112 and 113. The ceramic green sheet 203 for a cover portion may be formed of the same material and components as the ceramic green sheets 201 and 202, but the present disclosure is not limited thereto, and upper and lower cover portions 112 and 113 of the body 110 may be formed by a sintering process. In this case, the ceramic green sheet 203 for a cover portion may be formed on one surface and the other surface of the stacked body in the first direction, and may be formed of a single layer or multiple layers.

The conductive patterns 221 and 222 may be formed on the ceramic green sheets 201 and 202 by a paste for an internal electrode including a conductive metal. The conductive metal included in the conductive patterns 221 and 222 is not particularly limited, and a material having excellent electrical conductivity may be used for the conductive matter. For example, the conductive metal may include at least one of nickel (Ni), copper (Cu), palladium (Pd), silver (Ag), gold (Au), platinum (Pt), tin (Sn), tungsten (W), titanium (Ti), and alloys thereof. A method of forming the conductive patterns 221 and 222 on the ceramic green sheets 201 and 202 is not particularly limited. For example, a conductive paste for an internal electrode including the conductive metal may be formed by screen printing or gravure printing on ceramic green sheets 201 and 202.

The conductive patterns 221 and 222 may be stripe-type. Specifically, the internal electrode pattern may be formed to be in contact with both third directional ends of the ceramic green sheets 201 and 202 at regular intervals in the second direction.

The conductive patterns 221 and 222 may include a first conductive pattern 221 formed on one ceramic green sheet 201 and a second conductive pattern 222 formed on the other ceramic green sheet 202. In this case, a ceramic green sheet on which the first conductive pattern 221 is formed may be referred to as a first ceramic green sheet 201, and a ceramic green sheet on which the second conductive pattern 222 is formed may be referred to as a second ceramic green sheet 202.

Meanwhile, in the present disclosure, for convenience of explanation, a direction in which a plurality of ceramic green sheets disposed on the support film 310 are stacked is described as a first direction.

Stacked Body Cutting Operation

After the stacked body manufacturing operation, a stacked body cutting operation may be performed.

Referring to FIG. 6B, the stacked body 200 may be cut along cutting lines C1-C1 and C2-C2, orthogonal to each other. The cutting line C1-C1 is a cutting line in parallel with the second direction and is disposed substantially at equal intervals in the third direction, and the cutting line C2-C2 is a cutting line in parallel with the third direction and is disposed substantially at equal intervals in the second direction. A unit chip 210 having a substantially constant size in the third direction may be formed by the cutting line C1-C1, and a unit chip 210 having a substantially constant size in the second direction may be formed by the cutting line C2-C2.

A means for cutting the stacked body 200 is not particularly limited. For example, a blade cutting method such as a doctor blade and a dicing blade, a guillotine cutting method, or a laser cutting method may be used to cut the stacked body 200.

Referring to FIG. 6C, it may be confirmed that the stacked body 200 is formed of a plurality of unit chips 210 immediately after performing the stacked body cutting operation. The plurality of unit chips 210 may be attached to the support film 310 even after cutting, due to the adhesion of the support film 310.

Expansion Operation

After the stacked body cutting operation, an expansion operation may be performed. The expansion operation may be performed by stretching the support film 310 in the second direction and the third direction, but the present disclosure is not limited thereto, and the expansion operation may be performed by moving a plurality of unit chips 210 to a separate other film.

Opening Operation

After the expansion operation, an opening operation may be performed. The opening step is a process of easily forming a side margin portion by simultaneously opening side surfaces of a plurality of unit chips 210 to be one surface and the other surface of the body 110 in the third direction.

The side surfaces of the plurality of unit chips 210 may be surfaces cut by the cutting line C1-C1, and may be surfaces on which an end of the first conductive pattern 221 and an end of the second conductive pattern 222 are simultaneously exposed. A method of opening the side surfaces of the plurality of unit chips 210 is not particularly limited. For example, the method may be performed by rotating the plurality of unit chips 210 at the same time or moving the plurality of unit chips 210 to another film without rotation. In this case, the plurality of unit chips 210 may be moved to a separate adhesive tape 320.

Side Margin Portion Formation Operation

After the opening operation, a side margin portion formation operation may be performed.

In the side margin portion formation operation, a process of pressing and punching a ceramic green sheet for a side margin portion on one side surface SF of the unit chip 210 may be performed. In the side margin portion formation operation to be described below, the side margin portion is described as being formed only on one side surface SF of the unit chip 210, the same process may be performed on the other side of the unit chip 210.

Referring to FIGS. 8A and 8B, a method of attaching the ceramic green sheet 140 for a side margin to one side surface SF of the unit chip 210 is not particularly limited. For example, pressurization may be performed using an elastic pad 330. Specifically, the elastic pad 330 and the support plate 340 may be sequentially disposed on one surface of the adhesive tape 320 in which the plurality of unit chips 210 are not disposed, and the support plate 340, the elastic pad 330, a carrier film 350 and the ceramic green sheet 140 for a side margin portion may be sequentially stacked on an open surface side of the unit chip 210, and then, the pressure may be applied to the upper or lower support plate 340.

In this case, in an example embodiment, in order to prevent deformation or cracks from occurring in the ceramic green sheet 140 for a side margin portion, the ceramic green sheet 140 for a side margin portion may be attached to one side surface SF at a temperature of 50° C. to 150° C.

A method of forming the side margin portion with the ceramic green sheet 140 for a side margin portion attached to one side surface SF of the unit chip 210 is not particularly limited.

For example, after attaching the ceramic green sheet 140 for a side margin portion, pressure is applied to the ceramic green sheet 140 for a side margin portion to the extent that the elastic pad 330 is elastically deformed, and punching is performed to cut the ceramic green sheet 140 for a side margin portion by a part corresponding to one side surface SF. By such punching, the ceramic green sheet 140 for a side margin portion may be cut by a part corresponding to one side surface SF to form the side margin portion. The side margin portion may form a side margin portion 114 of the multilayer electronic component through a subsequent sintering process.

In an example embodiment, in the side margin portion formation operation, an attachment and punching of the ceramic green sheet 140 for a side margin portion may be performed in a state in which the ceramic green sheet 140 for a side margin portion is attached to the carrier film 350. Accordingly, rapid drying of the ceramic green sheet 140 for a side margin portion is prevented without applying a separate adhesive to the ceramic green sheet 140 for the side margin portion or one side surface SF, thereby securing sufficient adhesion in which the ceramic green sheet 140 for a side margin portion adheres to the one side surface SF.

Furthermore, in the process of performing the pressing and punching, since pressure is applied in the form of wrapping a corner of the unit chip 210, ends of the side margin portions 114 and 115 may have a rounded shape. Furthermore, by controlling the temperature and pressure during the pressurization and punching process, the value of A1/A2 or the value of B1/B2 of the multilayer electronic component 100 may be adjusted. That is, the value of A1/A2 or the value of B1/B2 of the multilayer electronic component 100 according to an example embodiment of the present disclosure may be controlled by adjusting variables of a process in which the pressing and punching are performed in the process of forming the side margin portion.

Referring to FIG. 9, in the process of pressing and punching the ceramic green sheet 140 for a side margin portion in a state in which the carrier film 350 is attached, one corner of the unit chip 210 may form a rounded shape. Furthermore, since an end of the ceramic green sheet 140 for a side margin portion is pressed and punched in a form in which the end thereof is surrounded by the carrier film 350, ends of the side margin portions 114 and 115 may also have a rounded shape.

In an example embodiment, since it is possible to prevent rapid drying of the ceramic green sheet 140 for a side margin portion, the punching may be performed at 50° C. or lower. Accordingly, since it is not necessary to maintain a high temperature to form the side margin portion, damage due to thermal impacts of the unit chip 210 or the ceramic green sheet 140 for a side margin portion may be reduced.

Meanwhile, the components of a carrier film 350 are not particularly limited. In an example embodiment, the carrier film 350 may include at least one of polyethylene terephthalate (PET), polyurethane (PU), polyethylene (PE), polyolefine (PO), polystyrene (PS), poly vinyl chloride (PVC), and poly vinydene chloride (PVDC). Accordingly, rapid drying of the ceramic green sheet 140 for the side margin portion attached to the carrier film 350 may be effectively prevented. Furthermore, the thickness of the carrier film 350 is not particularly limited, but the thickness of the carrier film 350 may be 1 μm or more so as to properly form the side margin portion, and the thickness of the carrier film 350 may be 50 μm or less so as to easily punch the ceramic green sheet for a side margin portion.

Then, a body forming operation of sintering the unit chip 210 in which the side margin portion is formed may be included. A sintering temperature is not particularly limited, but the sintering may be performed at, for example, 1000° C. to 1300° C. Furthermore, the sintering may be performed under a reducing atmosphere.

Then, the multilayer electronic component 100 may be manufactured by forming external electrodes 131 and 132 on each of one surface and the other surface of the body 110 in the second direction.

Meanwhile, the unit chip 210 in which the side margin portion is formed may be sintered without an additional process, thus forming the body 110, but the present disclosure is not limited thereto, and conductive pastes including a metal having excellent electrical conductivity may be disposed on one surface 3 and the other surface 4 in the second direction, respectively, and may be simultaneously sintered with the body 110, thus manufacturing the multilayer electronic component 100 by forming the external electrodes 131 and 132.

EXPERIMENTAL EXAMPLE

Comparative Example corresponds to a case in which the value of A1/A2 according to the present disclosure does not satisfy more than 1.5 and less than 2.5, or the value of B1/B2 does not satisfy more than 0.35 and less than 0.55, and Inventive Example corresponds a case in which the value of A1/A2 is more than 1.5 and less than 2.5, and the value of B1/B2 is more than 0.35 and less than 0.55.

Figure 10A:
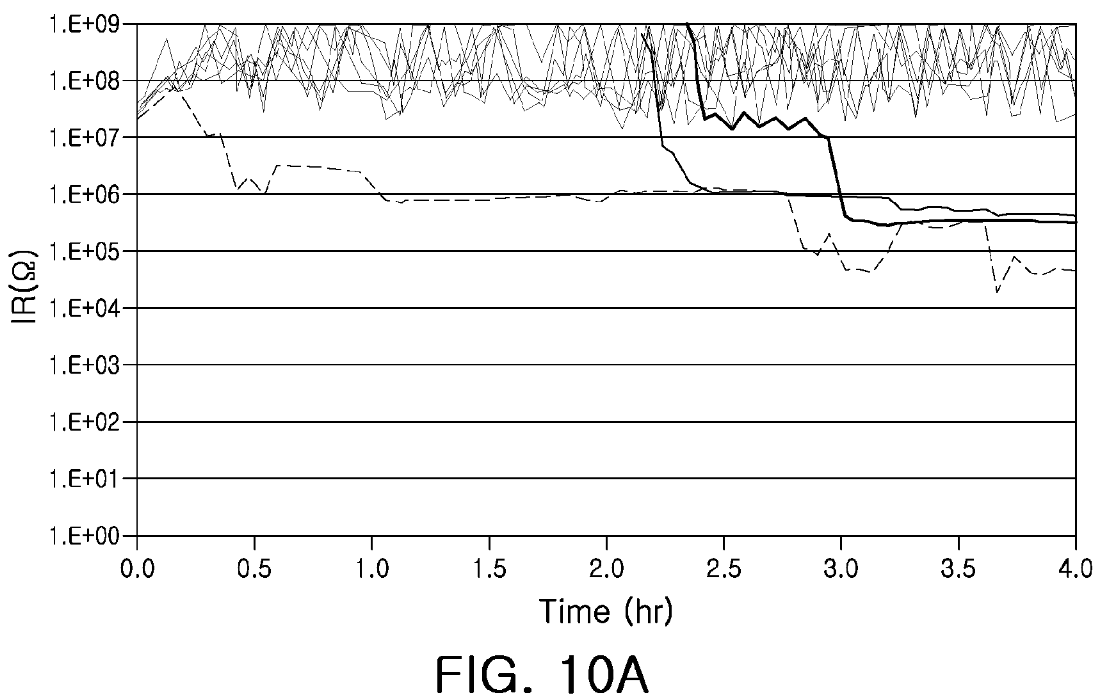
FIG. 10A is a graph illustrating a result of performing composite reliability evaluation of multilayer electronic components according to Comparative Example.
Figure 10B:
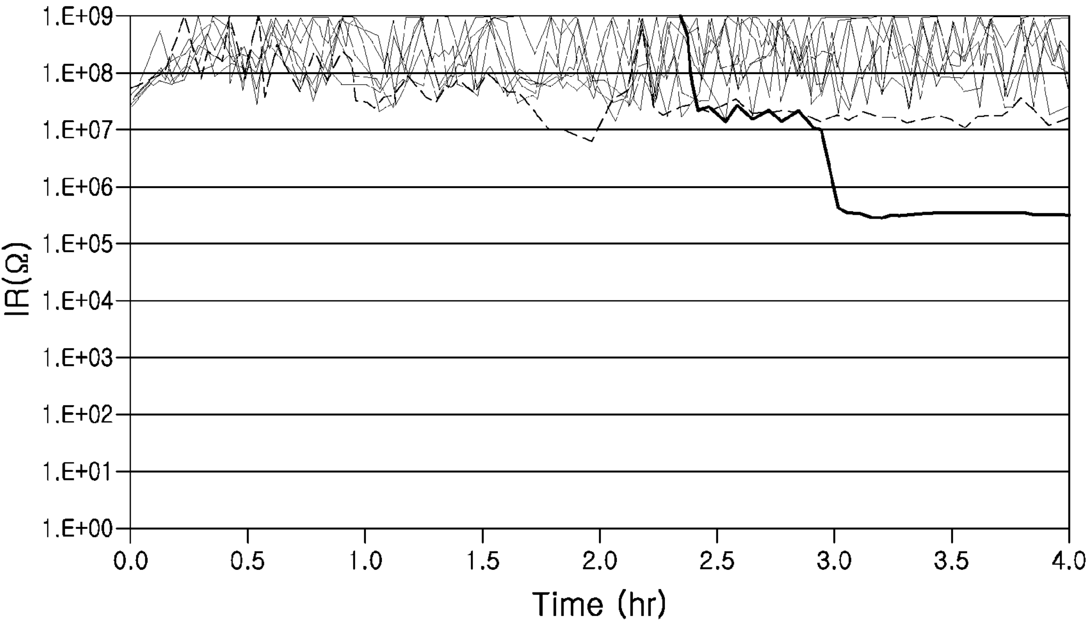
FIG. 10B is a graph illustrating a result of performing composite reliability evaluation of multilayer electronic components according to Inventive example.

FIG. 10A is a graph illustrating an evaluation of composite reliability of the multilayer electronic component according to Comparative Example, and FIG. 10B is a graph illustrating an evaluation of composite reliability of the multilayer electronic component according to Inventive Example.

Experiments were performed in 40 samples of Comparative Example and Inventive Example, and the insulation resistance (IR) was measured under evaluation conditions, specifically, relative humidity of 85%, a temperature of 85° C., 4.8 vr, and 4 hr, and accordingly, when an insulation resistance value is reduced to 10^7 (Ω) or less, this may be considered as a reliability failure.

Referring to FIG. 10A, in the case of the multilayer electronic component according to Comparative Example, three or more defective products are found, from which it may be seen that the moisture resistance reliability is not ensured. Referring to FIG. 10B, in the case of the multilayer electronic component according to Inventive Example, one defective product is found, from which it may be seen that the moisture resistance reliability is remarkably improved. Accordingly, as in an example embodiment of the present disclosure, when the value of A1/A2 is more than 1.5 and less than 2.5, and the value of B1/B2 value is more than 0.35 and less than 0.55 at the same time, the moisture resistance reliability of the multilayer electronic component 100 may be remarkably improved.

Various advantages and effects of the present disclosure are not limited to the above description, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:

a body including a dielectric layer and an internal electrode alternately arranged in a first direction, and including an active portion in which the dielectric layer and the internal electrode overlap each other in the first direction, and cover portions respectively disposed on one surface and the other surface of the active portion in the first direction;

external electrodes respectively disposed on one surface and the other surface of the body in a second direction, perpendicular to the first direction; and side margin portions respectively disposed on one surface and the other surface of the body in a third direction, perpendicular to the first direction and the second direction, wherein, in a cross-section in the first direction and the third direction, a boundary between the active portion and the cover portion is defined as an active-cover boundary, a boundary between the body and the side margin portion is defined as a first body-side margin boundary, an average distance in the first direction from the active-cover boundary to an end of the side margin portion in the first direction closest to the active-cover boundary among ends of the side margin portion in the first direction is defined as A1, an average distance in the third direction from the first body-side margin boundary to an end of the side margin portion in the third direction closest to the first body-side margin boundary among ends of the side margin portion in the third direction is defined as A2, and A1/A2 is more than 1.5 and less than 2.5, and in a cross-section of the multilayer electronic component in the second direction and the third direction, a boundary between the body and the side margin portion is defined as a second body-side margin boundary, an average distance in the second direction from an end in the active portion in the second direction to a surface closest to the end of the active portion in the second direction among surfaces of the body in the second direction is defined as B1, an average distance in the third direction from the second body-side margin boundary to an end of the side margin portion in the third direction closest to the second body-side margin boundary among ends of the side margin portion in the third direction is defined as B2, and B1/B2 is more than 0.35 and less than 0.55.

2. The multilayer electronic component according to claim 1, wherein ends of the side margin portion in the first direction and the third direction have a rounded shape.

3. The multilayer electronic component according to claim 1, wherein a corner of the body has a rounded shape.

4. The multilayer electronic component according to claim 1, wherein the side margin portion is disposed not to exceed one surface and the other surface of the body in the first direction.

5. The multilayer electronic component according to claim 1, wherein the side margin portion is disposed not to exceed one surface and the other surface of the body in the third direction.

6. The multilayer electronic component according to claim 1, wherein the external electrode is disposed to cover an end of the side margin portion, and a region of the external electrode disposed on the end of the side margin portion has a rounded shape.

7. The multilayer electronic component according to claim 1, wherein an average thickness of the dielectric layer is 0.35 μm or less.

8. The multilayer electronic component according to claim 1, wherein an average thickness of the internal electrode is 0.35 μm or less.

9. The multilayer electronic component according to claim 1, wherein an average thickness of the cover portions is 15 μm or less.

10. The multilayer electronic component according to claim 1, wherein an average thickness of the side margin portions is 15 μm or less.

11. A method of manufacturing a multilayer electronic component, comprising:

forming a body including a dielectric layer and an internal electrode alternately disposed in a first direction, and including an active portion in which the dielectric layer and the internal electrode overlap each other in the first direction, and a cover portion disposed on one surface and the other surface of the active portion in the first direction;

forming an external electrode on one surface and the other surface of the body in a second direction, perpendicular to the first direction; and forming a side margin portion on one surface and the other surface of the body in a third direction, perpendicular to the first direction and the second direction, wherein, in a cross-section in the first direction and the third direction, a boundary between the active portion and the cover portion is defined as an active-cover boundary, a boundary between the body and the side margin portion is defined as a first body-side margin boundary, an average distance in the first direction from the active-cover boundary to an end of the side margin portion in the first direction closest to the active-cover boundary among ends of the side margin portion in the first direction is defined as A1, an average distance in the third direction from the first body-side margin boundary to an end of the side margin portion in the third direction closest to the first body-side margin boundary among ends of the side margin portion in the third direction is defined as A2, and A1/A2 is more than 1.5 and less than 2.5, and in a cross-section of the multilayer electronic component in the second direction and the third direction, a boundary between the body and the side margin portion is defined as a second body-side margin boundary, an average distance in the second direction from an end of the active portion in the second direction to a surface closest to the end of the active portion in the second direction among surfaces of the body in the second direction is defined as B1, an average distance in the third direction from the second body-side margin boundary to an end of the side margin portion in third direction closest to the second body-side margin boundary among ends of the side margin portion in the third direction is defined as B2, and B1/B2 is more than 0.35 and less than 0.55.

12. The method of manufacturing a multilayer electronic component according to claim 11, wherein the side margin portion is formed by pressing and punching a ceramic green sheet for a side margin portion on one surface and the other surface of a unit chip in the third direction before sintering the body.

13. The method of manufacturing a multilayer electronic component according to claim 12, wherein the pressing and punching are performed in a state in which a carrier film is attached.

14. The method of manufacturing a multilayer electronic component according to claim 13, wherein the carrier film includes one or more of polyethylene terephthalate (PET), polyurethane (PU), polyethylene (PE), polyolefine (PO), poly styrene (PS), poly vinyl chloride (PVC) and poly vinydene chloride (PVDC).

15. The method of manufacturing a multilayer electronic component according to claim 13, wherein a thickness of the carrier film is 1 μm or more and 50 μm or less.

16. The method of manufacturing a multilayer electronic component according to claim 11, wherein ends of the side margin portion in the first direction and the third direction have a rounded shape.

17. The method of manufacturing a multilayer electronic component according to claim 11, wherein a corner of the body has a rounded shape.

18. The method of manufacturing a multilayer electronic component according to claim 11, wherein an average thickness of the cover portion is 15 μm or less, and an average thickness of the side margin portion is 15 μm or less.

* * * * *